Oct. 17, 1933.　　　　　　B. STEENSEN　　　　　　1,931,039
CARBURETOR AIR SUPPLYING SYSTEM
Filed Oct. 25, 1930　　　3 Sheets-Sheet 1
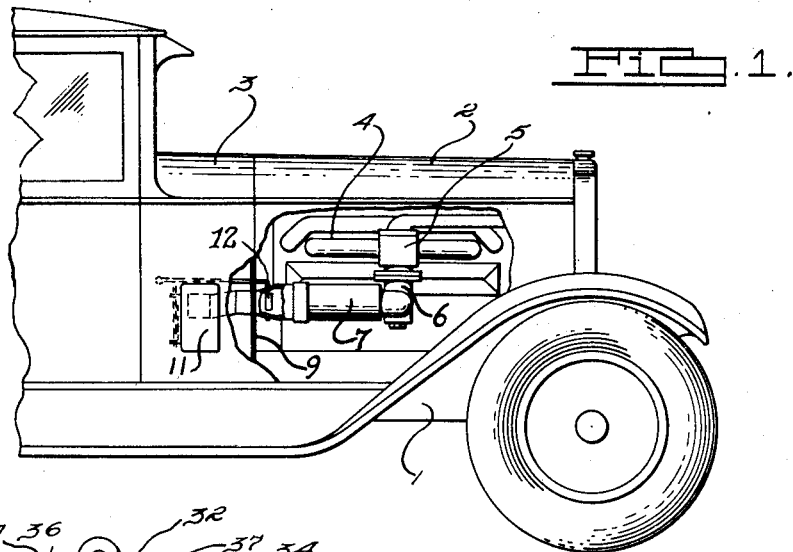
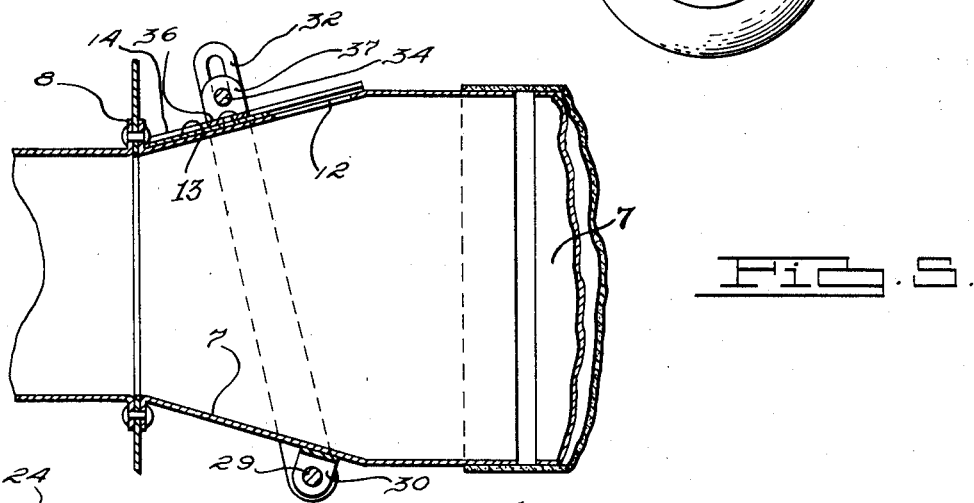
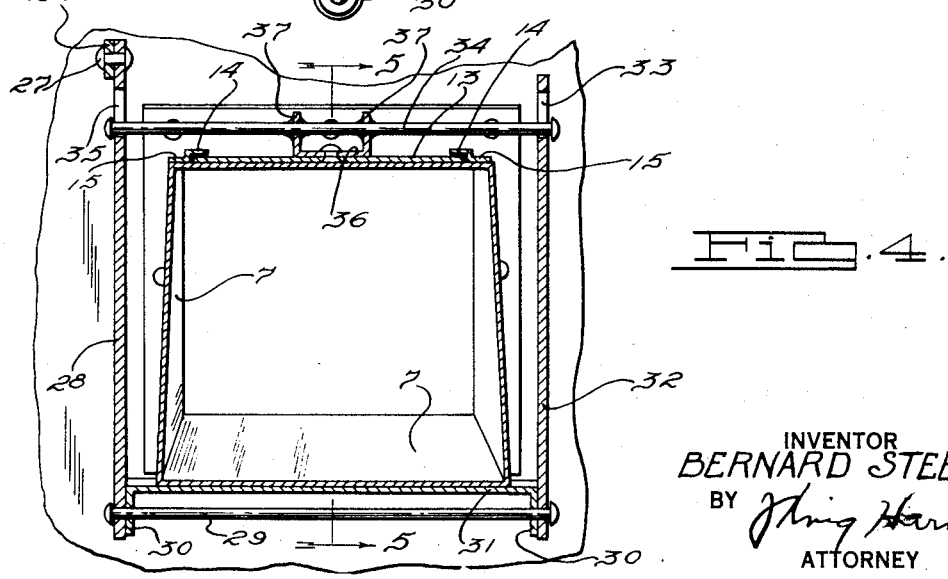
INVENTOR
BERNARD STEENSEN
BY
ATTORNEY Oct. 17, 1933. B. STEENSEN 1,931,039
CARBURETOR AIR SUPPLYING SYSTEM
Filed Oct. 25, 1930 3 Sheets-Sheet 2
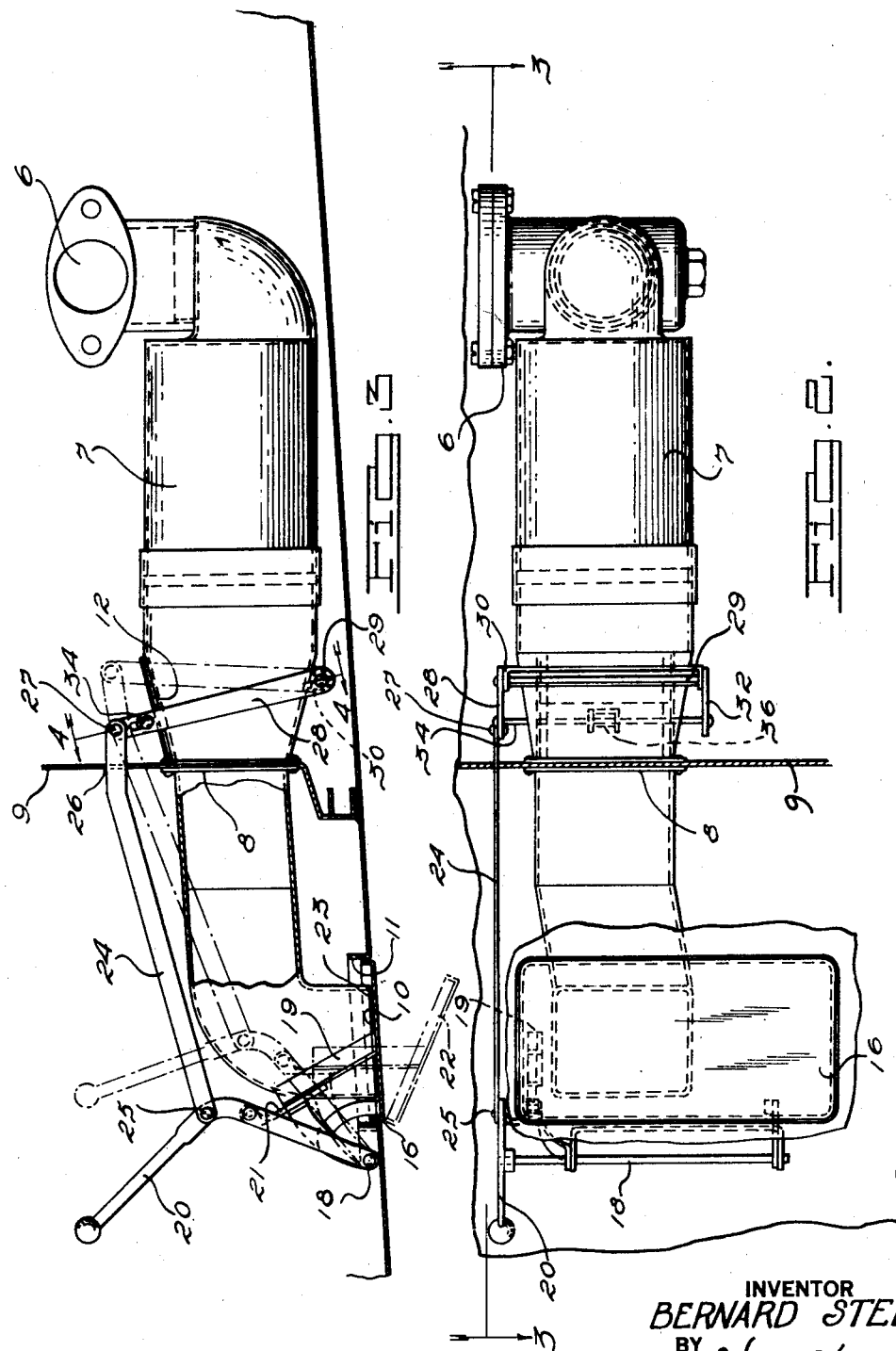
INVENTOR
BERNARD STEENSEN.
BY
ATTORNEY Oct. 17, 1933. B. STEENSEN 1,931,039
CARBURETOR AIR SUPPLYING SYSTEM
Filed Oct. 25, 1930  3 Sheets-Sheet 3

INVENTOR
BERNARD STEENSEN.
BY
ATTORNEY

Patented Oct. 17, 1933

1,931,039

UNITED STATES PATENT OFFICE 1,931,039

CARBURETOR AIR SUPPLYING SYSTEM

Bernard Steensen, Detroit, Mich., assignor to Chrysler Corporation, Detroit, Mich., a corporation of Delaware Application October 25, 1930. Serial No. 491,304

6 Claims. (Cl. 123—122)

This invention relates to an improved air supplying system for carburetors, particularly of vehicle engines.

The main objects of the invention are to provide means for conducting cool air from the exterior of the hood compartment of a vehicle to the carburetor thereof so as to supply dense air which has a high oxygen content for the fuel mixture; to provide an air duct having a cold air inlet that is remote from the regions which are heated directly by the engine and which communicates with the exterior atmosphere through the ventilating opening with which the cowls of vehicle bodies are customarily provided; to provide an internal warm air port in the air duct which is located in the interior of the hood compartment in close proximity to the engine; to provide a closure for the ventilating opening which is adapted to form a seal at the cold air inlet; to provide a closure for the internal warm air port of the duct; to provide mechanism for controlling the closures which is adapted to simultaneously opening one closure and closing the other so as to selectively condition the air supply for warm and cold air operations, respectively and to provide control mechanism of this kind by which both closures may be held in partially open positions so as to regulate the temperature of the air supplied to the carburetor.

An illustrative embodiment of my invention is shown in the accompanying drawings, in which:

Fig. 1 is a fragmentary side elevation of a vehicle showing a portion of the vehicle hood removed and showing an up draft carburetor air system.

Fig. 2 is a side elevation of my improved air supplying duct with obscuring parts removed showing the control mechanism for the inlet ports thereof.

Fig. 3 is a longitudinal vertical section taken on the line 3—3 of Fig. 2.

Fig. 4 is an enlarged transverse section taken on the line 4—4 of Fig. 3.

Fig. 5 is an enlarged fragmentary vertical section taken on the line 5—5 of Fig. 4 and showing the warm air inlet in detail.

Figure 6:
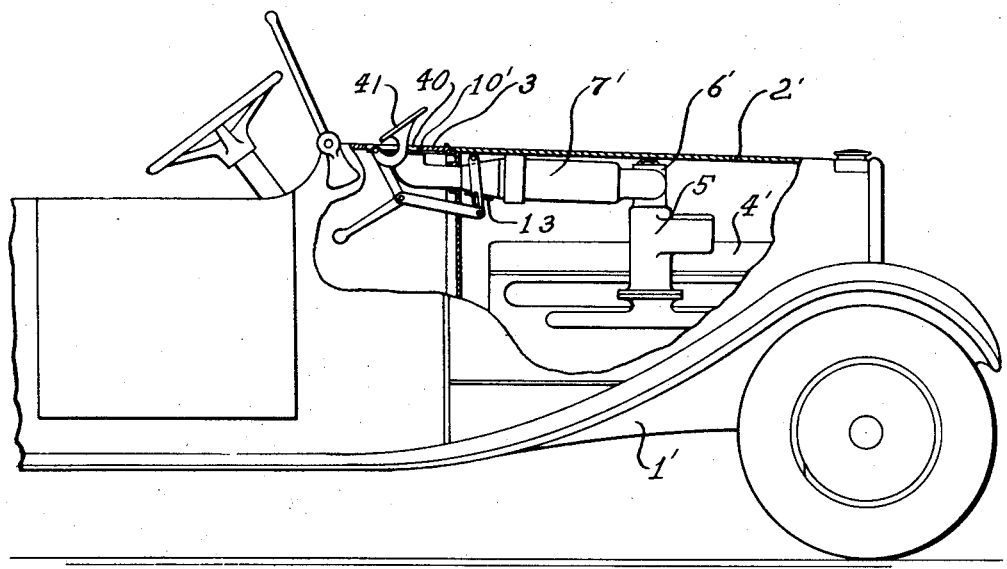
Fig. 6 is a fragmentary side elevation of a vehicle showing the air supplying system in connection with a down draft carburetor.

In the form shown, my improved air supplying system is illustrated in connection with a vehicle 1 having a hood 2, a cowl 3 and an engine 4 which is located in the hood compartment. The engine 4 is provided with a carburetor 5 which has an air passage 6 through which air is supplied for the fuel mixture.

Communicating with the air passage 6 of the carburetor is an air duct 7 which extends rearwardly from the interior of the hood compartment through an opening 8 in the dash 9 of the vehicle and into the space surrounded by the cowl 3 thereof. The rear end of the air duct 7 has a cool air inlet 10 which is located in a ventilating opening 11 formed in the side of the cowl 3. This arrangement of the air duct is particularly suitable for use in vehicles having an up draft carburetor, but in the event that the engine is provided with a down draft carburetor, the inlet end of the air duct preferably communicates with a ventilating opening, not shown, formed in the crown or top portion of the cowl.

That portion of the air duct which lies adjacent the motor 4 in the hood compartment is provided with a warm air inlet 12 which has a slidably mounted closure 13. The respectively opposite side edges of the slidable closure 13 are engaged between the outer surface of the duct 7 and flanges 14 of angular strips 15 of sheet metal that are rigidly attached to the duct.

The ventilating opening 11 of the cowl 3 is provided wtih a closure 16 which is swingably mounted on the cowl by a pair of angle arms having their inner ends journaled on a pin 18. The arms are located near the upper and lower ends respectively, of the closure. Secured at one end to the upper said portions of the closure 16 is an angle shaped arm 19 which is pivotally mounted at its other end on the pin 18.

An operating lever 20, also journaled on the pin 18, is provided for simultaneously regulating the closures 13 and 16. This operating lever has a pivotally attached member 21 which is rigidly secured to the arm 19. When the lever 20 is rotated forwardly, the arm 19 swings the closure 16 outwardly to the dotted line position shown at 22 in Fig. 3. Counter-clockwise rotation of the operating lever 20 draws the closure 16 inwardly bringing its inner surface into engagement with the extremity 23 of the cold air inlet 10 of the air duct.

A link 24 pivotally mounted at 25, on the operating lever 20 extends forwardly through a slot 26 of the dash 9 and is pivoted at 27 to a lever 28 which is journaled on one end of a pin 29 that extends transversely of the air duct and is located on the inner side thereof. This pin is also slidably engaged in a slot 35 formed in the upper end of the lever 28. Mounted on the cover 13 is a U-shaped bracket 36 having parallel sides 37 through which the pin 34 extends. Reciprocation of the lever 20 swings the members 28, 32 and 34 about the axis of the pin 29. This action slides the closure 13 rearwardly and forwardly as viewed in Fig. 3.

In operation of the vehicle in warm weather, it is desirable to supply cool air to the carburetor so as to gain the advantage of its density and high oxygen conduct per unit of volume. Ordinarily, during driving in warm weather, the closure of the cowl ventilator is left open so as to supply a current of the air to the interior of the body compartment of the vehicle. With my improved air duct and operating mechanism, when the cowl ventilator closure is open, the inlet end of the air duct is also uncovered permitting cold air from the exterior of the vehicle to flow to the carburetor. When the closure 16 of the ventilating opening in the cowl is swung outwardly by rotation of the lever 20 in a clockwise direction, the link 24 rotates the levers 28 and 32 forwardly, thereby sliding the closure 13 over the opening of warm air inlet and when the closure 16 is closed by a reverse movement of the lever 20, the closure of the warm air inlet 12 is opened. In this manner one inlet of the air duct is closed while the other is open.

In Fig. 6 is shown the vehicle 1' having a hood 2', a cowl 3' and an engine 4' which is located in the hood compartment. The engine 4' has a down draft carburetor 5' which includes an air passage 6' through which air is supplied for the fuel mixture.

The air passage 6' of the carburetor communicates with an air duct 7', extending rearwardly of the hood compartment along one side of and above the engine 4'. This air duct is identical in construction to the air duct 7 shown in Fig's. 1 to 5 inclusive, but when used in connection with a down draft carburetor of the type shown in Fig. 6, the inlet end of the air duct communicates with a louver 40 which is formed in the upper wall of the cowl 3'. The louver 4' has a swingable closure 41 which, when open, is inclined upwardly and forwardly so as to direct air downwardly into the cold air inlet 10' in the rear end of the duct. That portion of the duct 7' which is located in the hood compartment is provided with a warm air inlet having a closure 13' which is operated by the louver opening and closing mechanism in the manner described in connection with Fig's. 1 to 5 inclusive.

With this arrangement of the cold air inlet of the duct, it is possible to feed air to the carburetor at a somewhat lower temperature than the air which is collected at the side of the cowl in the manner illustrated in Fig. 1 for the air in the vicinity of the side of the hood contains some of the heated air which escapes from the hood compartment through the louvers in the side of the hood. If desired, the air duct 7, shown in Fig's. 1 to 5 inclusive, may be provided with an extension, not shown, reaching to the upper wall of the hood so as to supply cool air from this location of the vehicle to an up draft carburetor.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. In a vehicle having a hood compartment and an adjacent cowl having an opening in its crown portion, an engine in said hood compartment including a carburetor having an air passage, an air duct communicating at one end with the air passage of said carburetor and at its other end with the opening in said cowl for supplying cool air to said carburetor, a closure for said opening, arms on said closure pivotally mounted on said cowl, and mechanism fixed to said closure for regulating the same, said mechanism being adapted to firmly hold said closure against the outer end of said air duct so as to seal the same against the admission of air.

2. In a vehicle having a hood compartment and an adjacent cowl having a ventilating opening therein, an engine in said hood compartment including a carburetor having an air passage, an air duct communicating with the air passage of said carburetor and having a cold air inlet located in said ventilating opening, the inlet of said air duct occupying only a limited area of said opening so as to permit unobstructed passage of air through the opening and into the interior of said vehicle, and a closure for said opening adapted to abut against the end of said inlet so as to seal the same.

3. In a vehicle having a hood compartment and an adjacent cowl having a ventilating opening therein, an engine in said hood compartment including a carburetor having an air passage, an air duct communicating with the air passage of said carburetor and having a cold air inlet located in said ventilating opening, the inlet of said air duct occupying only a limited area of said opening so as to permit unobstructed passage of air through the opening and into the interior of said vehicle, a closure for said opening adapted to abut against the end of said inlet so as to seal the same, a warm air inlet in said air duct located in said hood compartment, a closure for said warm air inlet, and mechanism for simultaneous opening one of said closures and closing the other.

4. In a vehicle having a hood compartment and an adjacent cowl having a ventilating opening in its uppermost portion, an engine in said hood compartment including a carburetor having an air passage, a dash between the hood compartment and cowl having an opening therein, an air duct communicating with the air passage of said carburetor and extending through the opening in said dash, a cold air inlet in said duct located in said ventilating opening and occupying only a portion thereof, a warm air inlet in said air duct located on the front side of said dash, a closure for said warm air inlet slidably mounted on said duct, and mechanism for simultaneously opening one of said closures and closing the other.

5. In a vehicle having a hood compartment and an adjacent cowl having a ventilating opening in the crown portion of its upper wall, an engine in said hood compartment including a carburetor having an air passage, a dash between the hood compartment and cowl having an opening therein, an air duct communicating with the air passage of said carburetor and extending through the opening in said dash, a cold air inlet in said duct located in said ventilating opening and occupying only a portion thereof, a warm air inlet in said air duct located on the front side of said dash, a closure for said warm air inlet slidably mounted on said duct, and mechanism for simultaneously opening one of said closures and closing the other.

6. In a vehicle having an engine compartment and an adjacent cowl having an opening at its upper extremity, an engine in said compartment including a carburetor having an air inlet, a conduit communicating with said air inlet and said opening, a closure for said opening pivotly mounted at its rear extremity on said cowl, and means for holding said closure open at a forward inclination so as to provide a forced draft of air from said opening to the air inlet of said carburetor during forward movement of the vehicle.

BERNARD STEENSEN.